(12) United States Patent
Ligtenberg et al.

(10) Patent No.: US 7,565,720 B1
(45) Date of Patent: Jul. 28, 2009

(54) HINGE MECHANISM WITH CLUTCHING FUNCTION

(75) Inventors: Chris Ligtenberg, San Carlos, CA (US); Joshua Banko, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 11/097,869

(22) Filed: Apr. 1, 2005

(51) Int. Cl.
*E05D 3/06* (2006.01)
(52) U.S. Cl. ............................................. 16/366
(58) Field of Classification Search ............... 16/368, 16/366, 362, 352, 302, 287, 271, 265; 361/681–683, 361/803; 379/433.13, 433, 428; 455/90, 455/550, 556, 575, 90.3, 550.1, 556.1, 575.1; 403/83, 84, 119, 120
See application file for complete search history.

(56) References Cited

U.S. PATENT DOCUMENTS

| | | | | |
|---|---|---|---|---|
| 1,619,502 | A * | 3/1927 | Fox .............................. | 16/358 |
| 1,688,996 | A * | 10/1928 | Soss ............................. | 16/358 |
| 2,031,526 | A * | 2/1936 | Demuth ........................ | 16/358 |
| 2,100,928 | A * | 11/1937 | Way ............................. | 16/358 |
| 2,122,034 | A * | 6/1938 | Jackle .......................... | 16/358 |
| 2,208,887 | A * | 7/1940 | Westwood .................... | 16/360 |
| 3,881,221 | A * | 5/1975 | Schmidt ....................... | 16/366 |
| 4,366,597 | A * | 1/1983 | Rasmussen ................... | 16/368 |
| 4,564,975 | A * | 1/1986 | Kuffner ........................ | 16/370 |
| 4,718,740 | A * | 1/1988 | Cox .......................... | 312/223.2 |
| 4,843,680 | A * | 7/1989 | Cress et al. .................... | 16/289 |
| 5,481,430 | A * | 1/1996 | Miyagawa et al. ........... | 361/681 |
| 5,494,447 | A * | 2/1996 | Zaidan .......................... | 439/31 |
| 5,603,100 | A * | 2/1997 | Yasuda ......................... | 455/566 |
| 5,644,469 | A * | 7/1997 | Shioya et al. ................. | 361/681 |
| 5,768,096 | A * | 6/1998 | Williams et al. ............. | 361/681 |
| 5,991,150 | A * | 11/1999 | Chiu et al. ..................... | 361/681 |
| 6,233,138 | B1 * | 5/2001 | Osgood ......................... | 361/681 |
| 6,384,811 | B1 * | 5/2002 | Kung et al. .................... | 345/168 |
| 6,487,755 | B1 * | 12/2002 | Caldari ........................... | 16/370 |
| 6,532,147 | B1 * | 3/2003 | Christ, Jr. ..................... | 361/683 |
| 6,829,808 | B2 * | 12/2004 | Neukotter ...................... | 16/366 |
| 7,065,835 | B2 * | 6/2006 | Kuramochi .................... | 16/357 |
| 2002/0126446 | A1 * | 9/2002 | Miyako et al. ................ | 361/683 |

FOREIGN PATENT DOCUMENTS

| | | | | |
|---|---|---|---|---|
| DE | | 3623662 | A1 * | 2/1988 |
| DE | EP | 528032 | A1 * | 2/1993 |
| FR | | 2574108 | A1 * | 6/1986 |

* cited by examiner

*Primary Examiner*—Robert J Sandy
*Assistant Examiner*—Ruth C Rodriguez
(74) *Attorney, Agent, or Firm*—IP Strategy Group, P.C.

(57) ABSTRACT

In embodiments of the present invention, hinge mechanisms for use in a portable computing device having a base and a lid are presented, the hinge mechanism including: a base link pivotally connected with a base such that the base link rotates about a first axis of rotation, the base link being in sliding communication with a lid; a lid link pivotally connected with the lid such that the lid link rotates about a second axis of rotation, the lid link being in sliding communication with the base; and a center pin pivotally connecting the base link with the lid link such that the base link and the lid link rotate about a third axis of rotation wherein the base link, the lid link, and the center pin cooperatively function to translate the lid over at least two planes of motion with respect to the base.

20 Claims, 8 Drawing Sheets

HINGE MECHANISM WITH CLUTCHING FUNCTION

BACKGROUND OF THE INVENTION

The present invention relates generally to hinge mechanisms. More particularly, the present invention relates to a hinge mechanism which is suitable for use in a portable computing device such as a notebook computer.

Advances in computing hardware technology continue to enable lower dimensional profile computing devices while maintaining robust processing power typically associated with larger devices. No where are these advances more apparent than in the portable computing field. Notebook computers, once a burdensome luxury with limited capability, are now full-featured computing devices that are quickly becoming ubiquitous in both the business and home markets.

Figure 1:
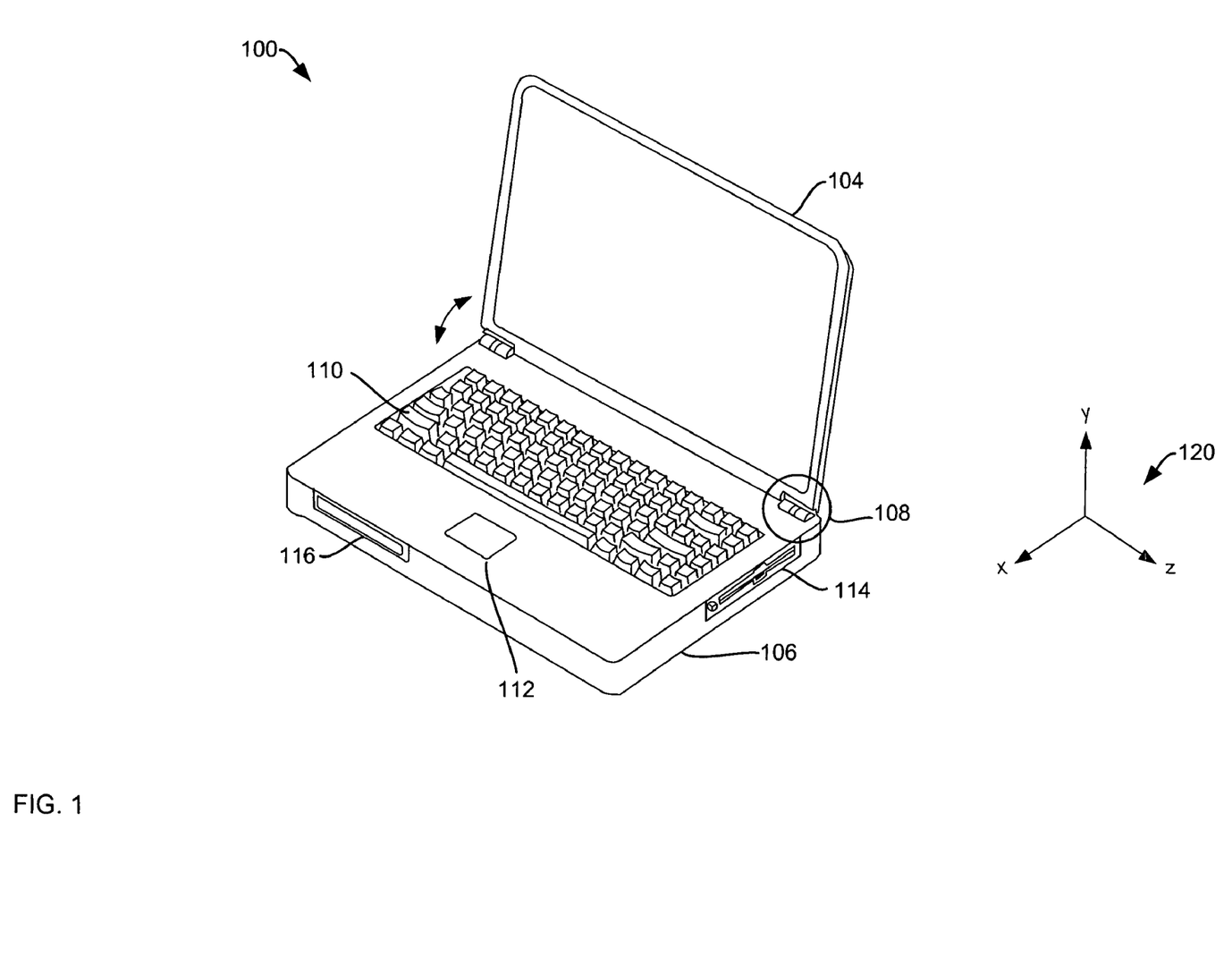
FIG. 1 is an illustrative representation of a portable computing device.

Portable computing devices may be typically configured with a base housing various computer components and a display. In one such example, FIG. 1 is an illustrative representation of a portable computing device 100. Portable computing device 100 includes a base 106 and a display 104. Base 106 may house a variety of computer components including a keyboard 110, a pointing device 112, a removable disk drive 114, and a permanent disk drive 116. Base 106 may further include a variety of access ports for interfacing with other computing components including, but not limited to, a USB port (not shown), a parallel port (not shown), a serial port (not shown), a docking station interconnect (not shown), a network port (not shown) or a monitor port (not shown). Further, display 104 may be configured in any of a number of different sizes and resolutions depending on user preference.

Base 106 and display 104 may be attached with a hinge mechanism 108. In the example illustrated, display 104 rotates about an axis defined by hinge 108 from closed (0°) to approximately 120°. In a typical configuration, a single pin is integral to hinge 108 and provides a rotational axis about which display 104 may rotate. In some examples, hinge 108 may be configured with a braking device (not shown). Braking devices generally apply sufficient holding force to allow freedom of movement of a display without lifting a base and to allow a display to maintain a desired position.

As can be appreciated, a pinned hinge mechanism configuration requires the mechanism to be located at or nearly proximal to a base edge because of clearance requirements. That is, in order for a display to rotate freely about a pinned hinge mechanism, the display must be located such that any display portion extending beyond the pinned hinge mechanism does not interfere with the base. Furthermore, because the location of a pinned hinge mechanism must be located at or nearly proximal to a base edge, there must be sufficient structural strength to support the configuration at the base edge.

In current examples, where portable computing device bases range from approximately 20 to 30 mm in thickness, there exists ample structural strength to support a hinge located at or nearly proximal to a base edge. However, as noted above, portable computing device profiles are continually shrinking along with integral computer components. As such, base thicknesses under approximately 20 mm are becoming increasingly common. In at least some of those examples, a pinned hinge mechanism's structural requirements may exceed the structural capability of base materials given smaller size design requirements thus necessitating relocation of a hinge mechanism away from a base edge. Therefore improved hinge mechanisms are described herein.

SUMMARY OF INVENTION

In embodiments of the present invention, hinge mechanisms for use in a portable computing device having a base and a lid are presented, the hinge mechanism including: a base link pivotally connected with a base such that the base link rotates about a first axis of rotation, the base link being in sliding communication with a lid; a lid link pivotally connected with the lid such that the lid link rotates about a second axis of rotation, the lid link being in sliding communication with the base; and a center pin pivotally connecting the base link with the lid link such that the base link and the lid link rotate about a third axis of rotation wherein the base link, the lid link, and the center pin cooperatively function to translate the lid over at least two planes of motion with respect to the base. In some embodiments, the hinge mechanism further includes: a base slider pin rigidly attached with the base link, the lid configured to slidingly receive the base slider pin; and a lid slider pin rigidly attached with the lid link, the base configured to slidingly receive the lid slider pin.

In other embodiments, portable computing devices are presented including: a base; a lid; and a hinge mechanism coupled with the base and the lid and arranged to translate the lid vertically and horizontally with respect to the base while the lid pivotally rotates with respect to the base. In some embodiments, the hinge mechanism further includes: a base link pivotally connected with the base such that the base link rotates about a first axis of rotation, the base link being in sliding communication with the lid; a lid link pivotally connected with the lid such that the lid link rotates about a second axis of rotation, the lid link being in sliding communication with the base; a center pin pivotally connecting the base link with the lid link such that the base link and the lid link rotate about a third axis of rotation wherein the base link, the lid link, and the center pin cooperatively function to translate the lid over at least two planes of motion with respect to the base; a base slider pin rigidly attached with the base link, the lid configured to slidingly receive the base slider pin; and a lid slider pin rigidly attached with the lid link, the base configured to slidingly receive the lid slider pin.

In other embodiments, hinge mechanisms for coupling a first piece to a second piece are presented including: a first link pivotally connected with the first piece such that the first link rotates about a first axis of rotation, the first link being in sliding communication with the second piece; a second link pivotally connected with the second piece such that the second link rotates about a second axis of rotation, the second link being in sliding communication with the first piece; a center pin pivotally connecting the first link with the second link such that the first link and the second link rotate about a third axis of rotation wherein the first link, the second link, and the center pin cooperatively function to translate the second piece over at least two planes of motion with respect to the first piece; a first piece slider pin rigidly attached with the first link, the second piece configured to slidingly receive the first piece slider pin; and a second piece slider pin rigidly attached with the second link, the first piece configured to slidingly receive the second piece slider pin.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

FIG. 2 is an illustrative representation of an embodiment of the present invention in a closed (0°) position. It should be noted that illustrations of embodiments of the present invention are illustrated in cross-section for clarity. As such, although embodiments illustrated appear to be located on the outside of a side edge of a base and a lid no such limitation is intended. Further, mirror views of embodiments are intended to clarify the present invention. As such, a portable computing device 200 is illustrated having a base 204 and a lid 208. In some embodiments, lid 208 may be configured as a display. As such, an integrated lid/display may be utilized under embodiments of the present invention. As illustrated, base 204 and lid 208 are in a closed (0°) position. Base 204 and lid 208 may be attached with a hinge mechanism which includes a base link 212 and a lid link 228. Base link 212 and lid link 228 function cooperatively to rotate and translate lid 208 with respect to base 204.

Base link 212 includes a base pin 216, a center pin 224, and a base slider pin 220. Base pin 216 pivotally attaches base link 212 with base 204. Base pin 216 may be configured so that base link 212 rotates around a first axis of rotation 260. Base pin 216 may be fixedly attached to either base link 212 or to base 204. Frictional force may be applied to base pin 216. Frictional force may be applied by any of a number of friction elements well-known in the art. In one embodiment, frictional element 804 (see FIG. 8) may be used to apply frictional force to base pin 216. Friction elements may be selected such that an application of linear friction through a defined degree of rotation may be applied.

Center pin 224 may be configured so that base link 212 may rotate around a second axis of rotation 270. Center pin 224 pivotally attaches base link 212 with lid link 228. Center pin 224 may be fixedly attached to base link 212; to lid link 228; or to neither. Further, in some embodiments, a friction element (not shown) may be applied to center pin 224 without departing from the present invention. Finally, base slider pin 220 may be configured to allow base link 212 to translate along lid slide way (see 604, FIG. 6). Lid slide way 604 (see FIG. 6) may be configured to limit translation of lid 208. In some configurations, a lid slide way may be arcuate in path. In other configurations a lid slide way may be semi-arcuate or straight in path. The particular geometry selected for a slide way path depends on user requirements.

Lid link 228 includes a lid pin 232, a center pin 224, and a lid slider pin 236. Lid pin 232 pivotally attaches lid link 228 with lid 208. Lid pin 232 may be configured so that lid link 228 rotates around a third axis of rotation 250. Lid pin 232 may be fixedly attached to either lid link 228 or to lid 208. Frictional force may be applied to lid pin 232. Frictional force may be applied by any of a number of friction elements (not shown) well-known in the art. As noted above, in one embodiment, frictional element 804 (see FIG. 8) may be used to apply frictional force to base pin 216. Friction elements may be selected such that an application of linear friction through a defined degree of rotation may be applied.

Center pin 224 may be configured so that, like base link 212, lid link 228 may rotate around a second axis of rotation 270. Center pin 224 pivotally attaches base link 212 with lid link 228. Center pin 224 may be fixedly attached to base link 212; to lid link 228; or to neither. Further, in some embodiments, a friction element (not shown) may be applied to center pin 224 without departing from the present invention. Finally, lid slider pin 236 may be configured to allow lid link 228 to translate along base slide way (see 608, FIG. 6). Base slide way 608 (not shown) may be configured to limit translation of lid 208. In some configurations, a base slide way may be arcuate in path. In other configurations a base slide way may be semi-arcuate or straight in path. The particular geometry selected for a slide way path depends on user requirements.

As can be appreciated, a combination of multiple axes of rotation in cooperative communication with at least one slide way allows a lid to be translated in two dimensions while undergoing rotation. One advantage, as noted above, to this translation is that centers of gravity may be translated to a more favorable position. Another advantage is that translation allows a hinge mechanism to be located to a more structurally advantageous position, which may be desirable in low profile configurations.

Figure 2A:
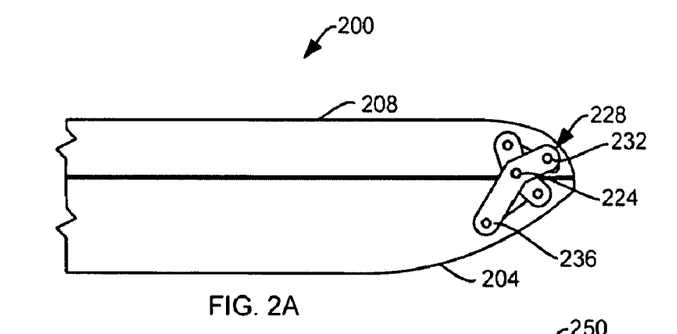
FIGS. 2A-2F is an illustrative representation of an embodiment of the present invention in a closed (0°) position.
Figure 2B:
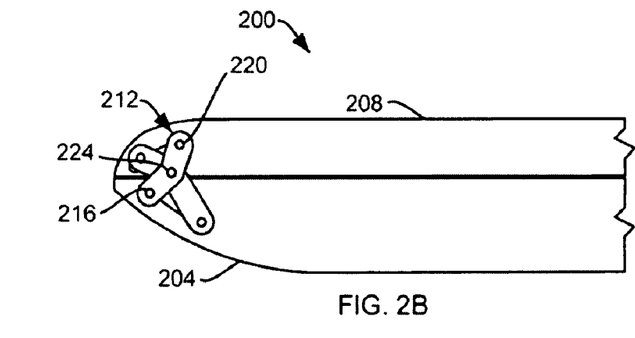
Figures 2C, 2E:
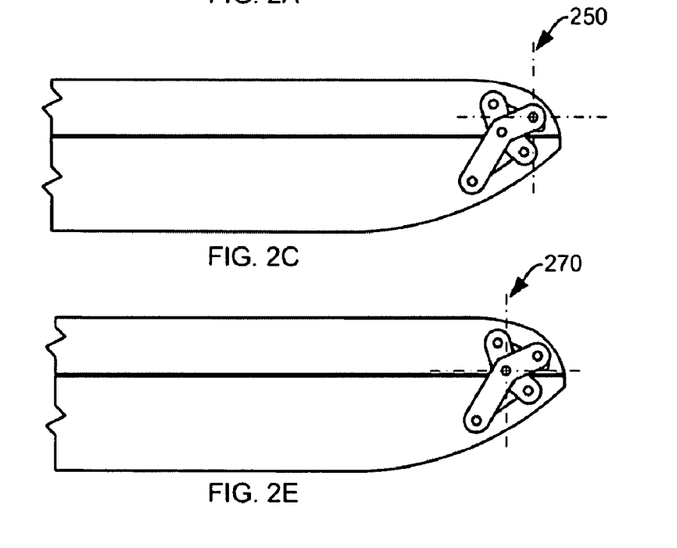
Figures 2D, 2F:
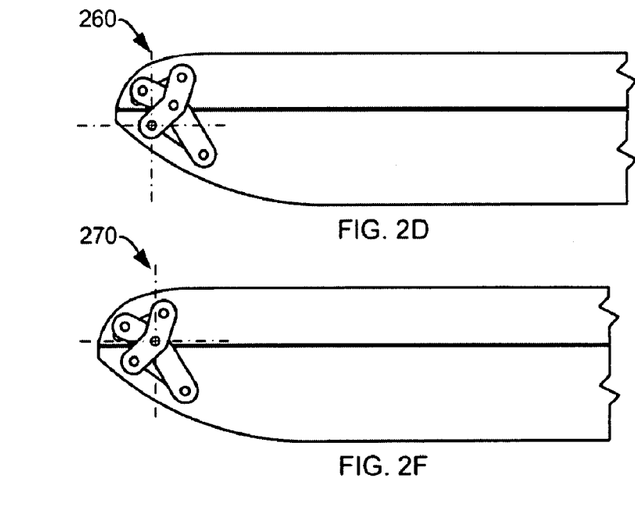
Figure 3A:
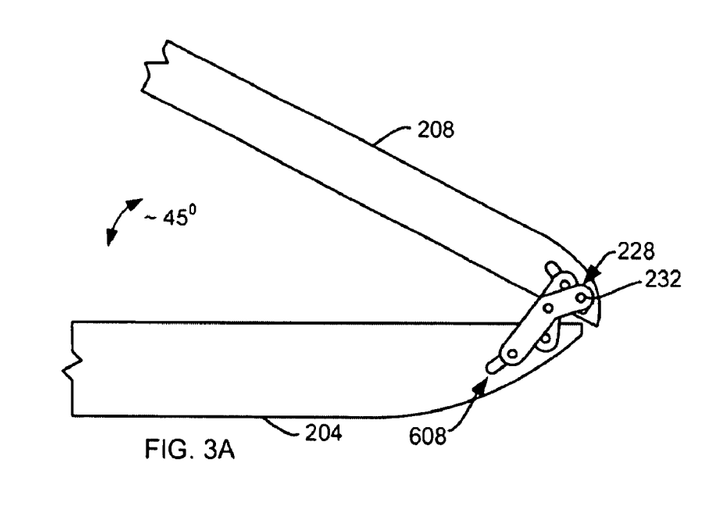
FIGS. 3A and 3B is an illustrative representation of an embodiment of the present invention in an open position at approximately 45° from closed position.
Figure 3B:
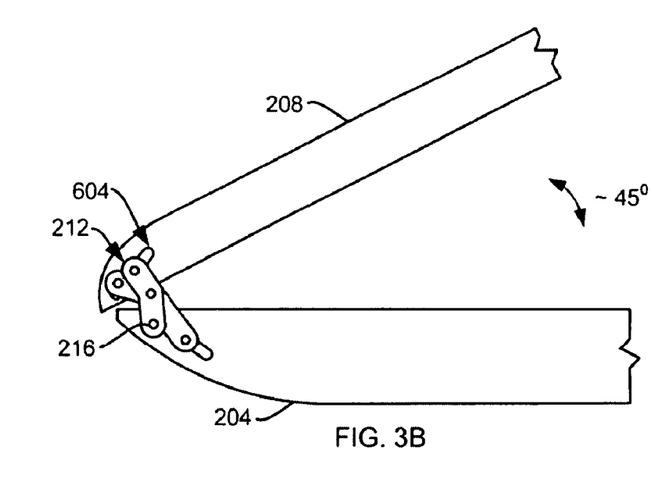

Referring to FIG. 3, FIG. 3 is an illustrative representation of an embodiment of the present invention in an open position at approximately 45° from closed position. As can be appreciated, as illustrated, base link 212 and lid link 228 have each rotated about a common axis 270 (see FIG. 2). Further, base link 212 and lid link 228 may each rotate about axes 260, 250 (see FIG. 2) respectively. Still further, base link 212 and lid link 228 have translated along slide ways 604 and 608 respectively. As can be seen, base slide way 608 may be configured to direct lid link 228 upward and thus correspondingly direct lid 208 upward. Lid slide way 604 may be configured to constrain lid's movement relative to base link 212 to a desired geometry. Further, as noted above, friction elements (not shown) may be configured to linearly engage base pin 216 or lid pin 232 at approximately 45° from closed position.

Figure 4A:
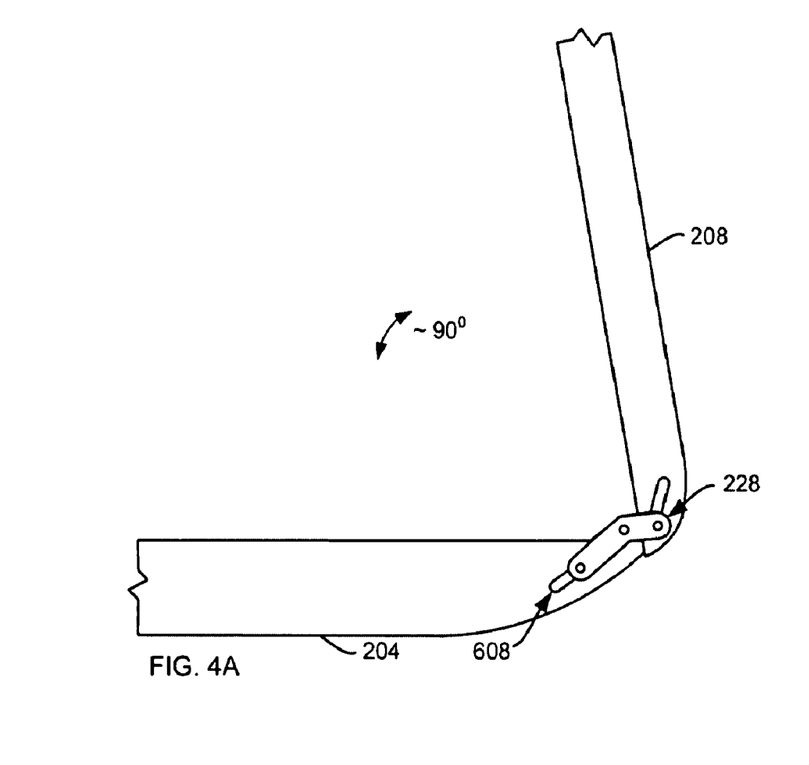
FIGS. 4A and 4B is an illustrative representation of an embodiment of the present invention in an open position at approximately 90° from closed position.
Figure 4B:
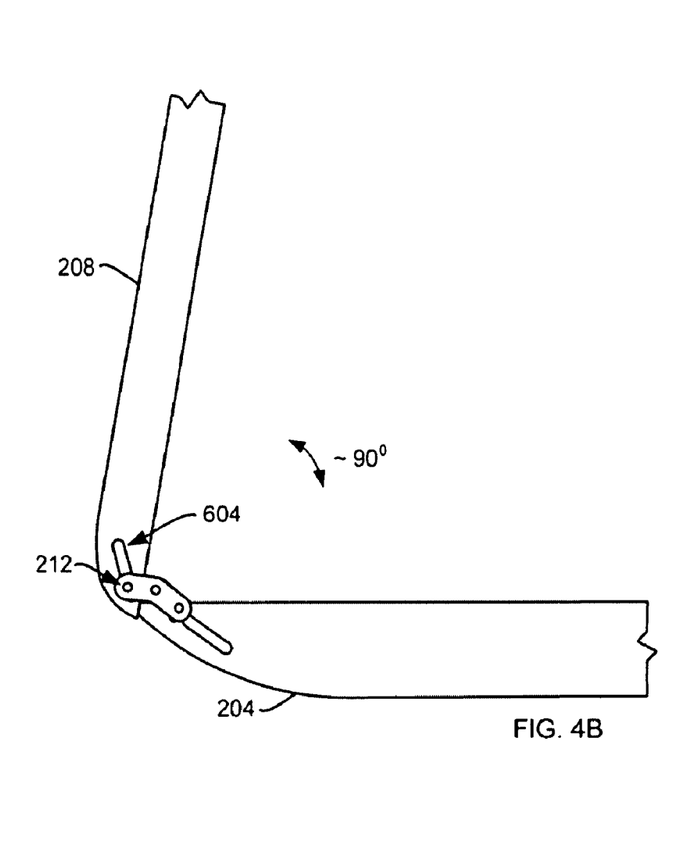

Turning to FIG. 4, FIG. 4 is an illustrative representation of an embodiment of the present invention in an open position at approximately 90° from closed position. As can be appreciated, as illustrated, base link 212 and lid link 228 have each further rotated about a common axis 270 (see FIG. 2). Further, base link 212 and lid link 228 have each further rotated about axes 260, 250 (see FIG. 2) respectively. Still further, base link 212 and lid link 228 have further translated along slide ways 604 and 608 respectively.

Figures 5A, 5B:
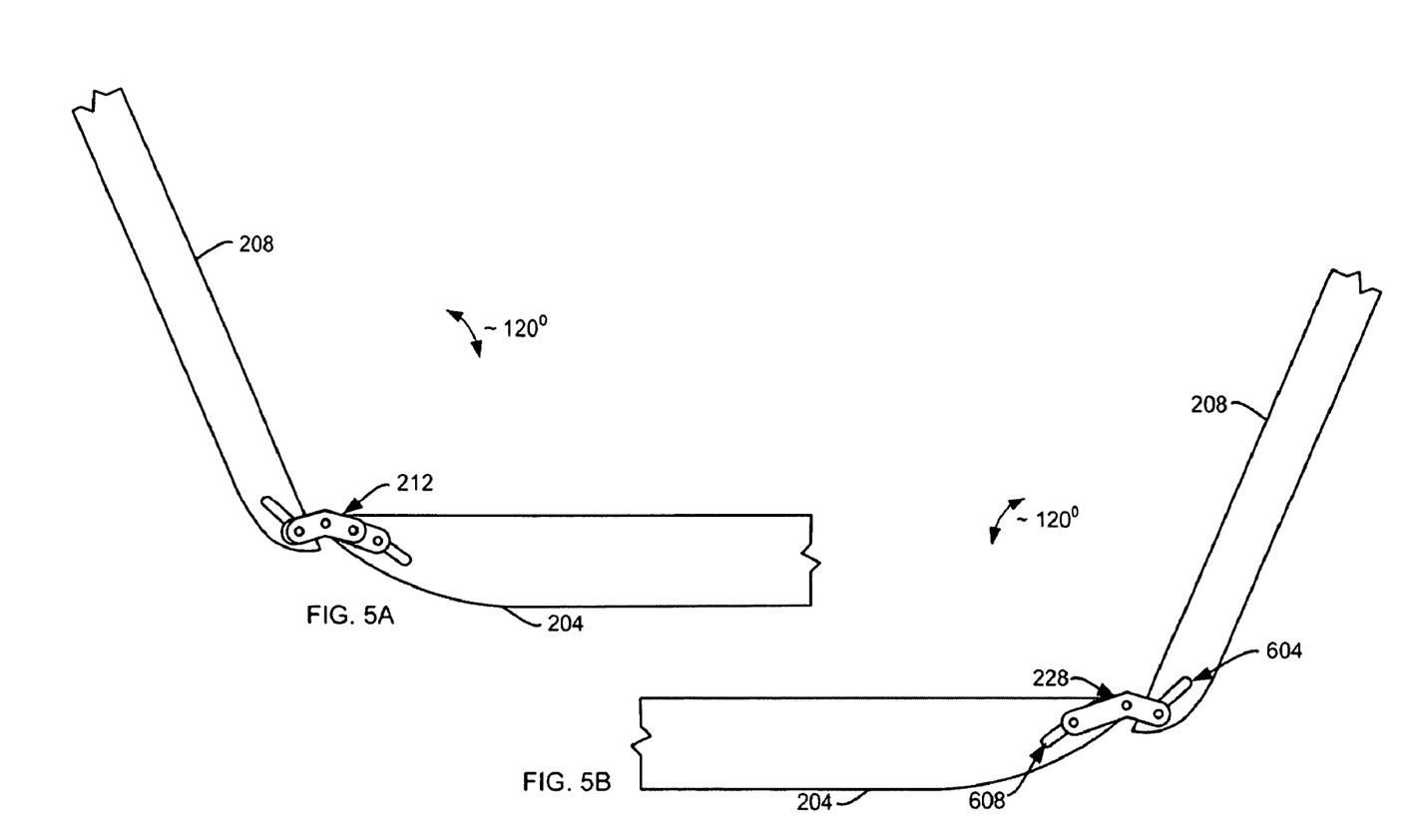
FIG. 5 is an illustrative representation of an embodiment of the present invention in an open position at approximately 120° from closed position.

FIG. 5 is an illustrative representation of an embodiment of the present invention in an open position at approximately 120° from closed position. As can be appreciated, as illustrated, base link 212 and lid link 228 have each further rotated about a common axis 270 (see FIG. 2). Further, base link 212 and lid link 228 have each further rotated about axes 260, 250 (see FIG. 2) respectively. Still further, base link 212 and lid link 228 have further translated along slide ways 604 and 608, respectively, to an extended position.

Figure 6:
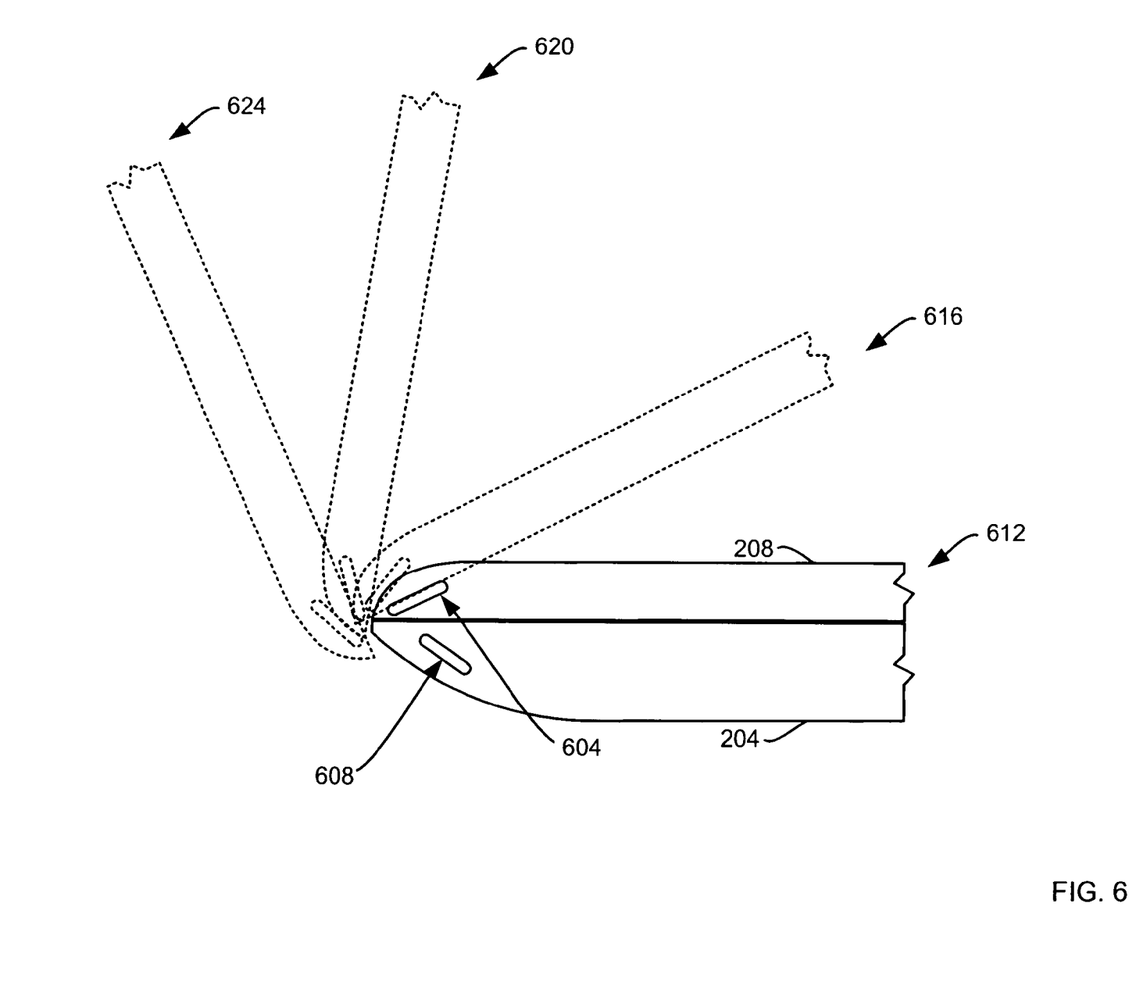
FIG. 6 is an illustrative representation of an embodiment of the present invention in various open positions.

Referring to FIG. 6, FIG. 6 is an illustrative representation of an embodiment of the present invention in various open positions. More particularly, FIG. 6 illustrates relative positions of base slide way 608 and lid slide way 604 in various open positions (e.g. 0°(612), 45°(616), 90°(620), and 120° (624)). As noted above, slide ways 604 and 608 may be configured to constrain movement to a desired geometry. In some configurations, slide ways may be arcuate in path. In other configurations slide ways may be semi-arcuate or straight in path. The particular geometry selected for a slide way path depends on user requirements.

Figure 7:
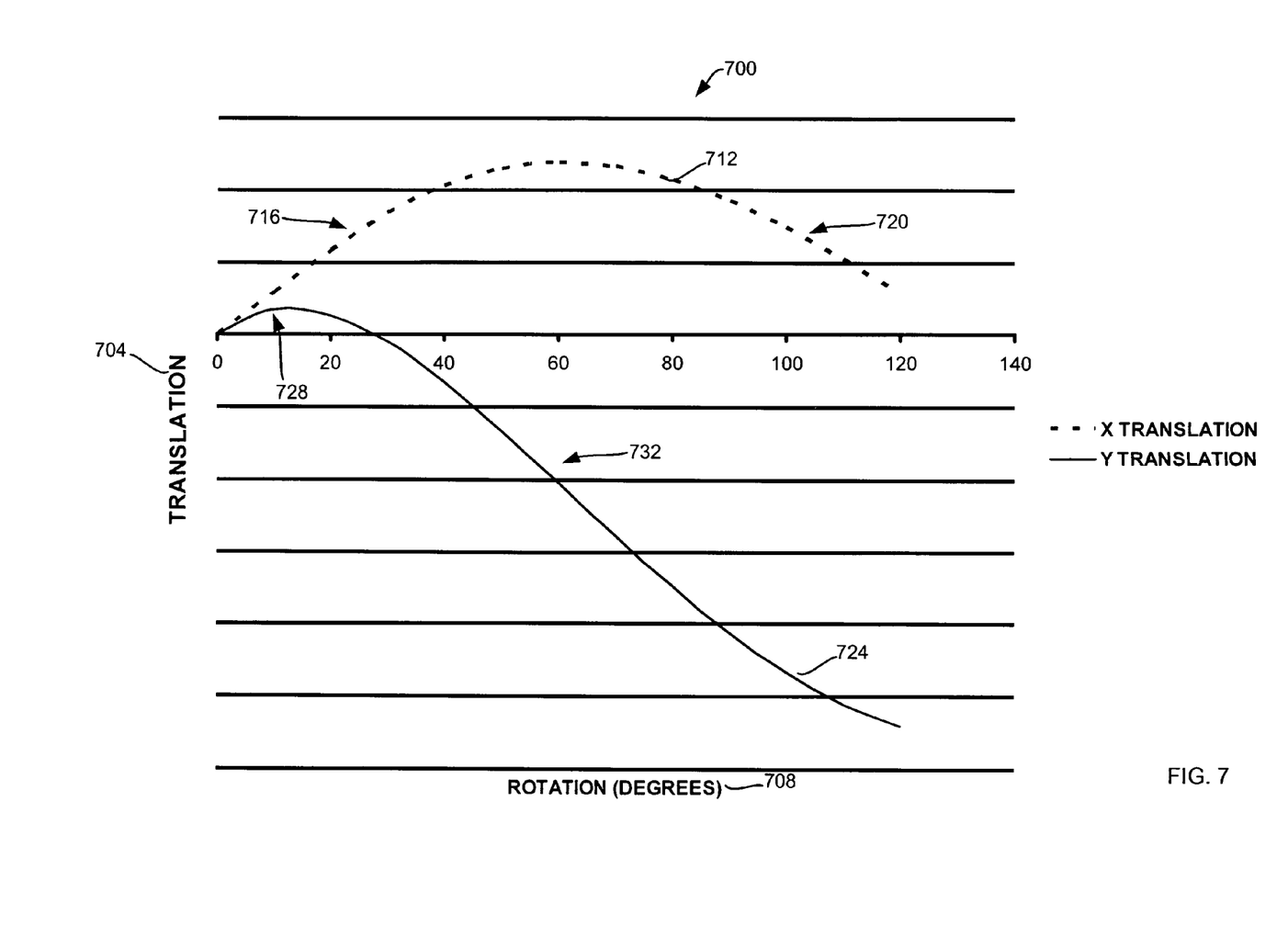
FIG. 7 is a graphical representation illustrating a system movement curve of translation over rotation in embodiments of the present invention.

Turning to FIG. 7, FIG. 7 is a graphical representation illustrating a system movement curve 700 of translation over rotation in embodiments of the present invention. As can be appreciated, the translation curves described herein are for illustrative purposes to demonstrate general trends and are not intended to be inherently limiting. As such, a translation axis 704 and a rotation (in degrees) axis 708 are illustrated. An x-translation curve 712 may represent a general trend of movement of a lid. That is, the movement of a lid through a first plane of motion with respect to a base. As noted above, an orientation legend 120 is illustrated in FIG. 1. Thus, x-translation may be thought of as horizontal movement (i.e. first plane) with respect to a base 204 (see FIG. 2). X-translation curve 712 demonstrates a general trend upward 716 from a net zero position. A net zero position is a position corresponding to a position at 0° of rotation. The general upward trend 716 continues to approximately 65° of rotation whereupon a general downward trend 720 may be observed. The general downward trend 720 then continues until the end of rotation at approximately 120° of rotation.

A y-translation curve 724 may represent a general trend of movement of a lid. That is, the movement of a lid through a second plane of motion with respect to a base. As noted above, an orientation legend 120 is illustrated at FIG. 1. Thus, y-translation may be thought of as vertical movement (i.e. second plane) with respect to a base 204 (see FIG. 2). Y-translation curve 724 demonstrates a general trend upward 728 from a net zero position. A net zero position is a position corresponding to a position at 0° of rotation. The general upward trend 728 continues to approximately 10° of rotation whereupon a general downward trend 732 may be observed. The general downward trend 732 then continues until the end of rotation at approximately 120° of rotation.

As may be appreciated, selection of particular geometries of the components described herein may have a marked effect on exact translation curves. Thus, translation curves illustrated in this example, is indicative of a general trend rather than as an exact path. For example, where a slide way is configured as a arcuate path, a corresponding translation curve may differ from a translation curve from a slide way configured as a straight path although, in some examples, a start point and an endpoint may be the same for both paths. By selecting a particular geometry for a slide way path, specific tolerances may be achieved. Likewise, in other examples, different selected pin placements may result in different translation curves.

Figure 8:
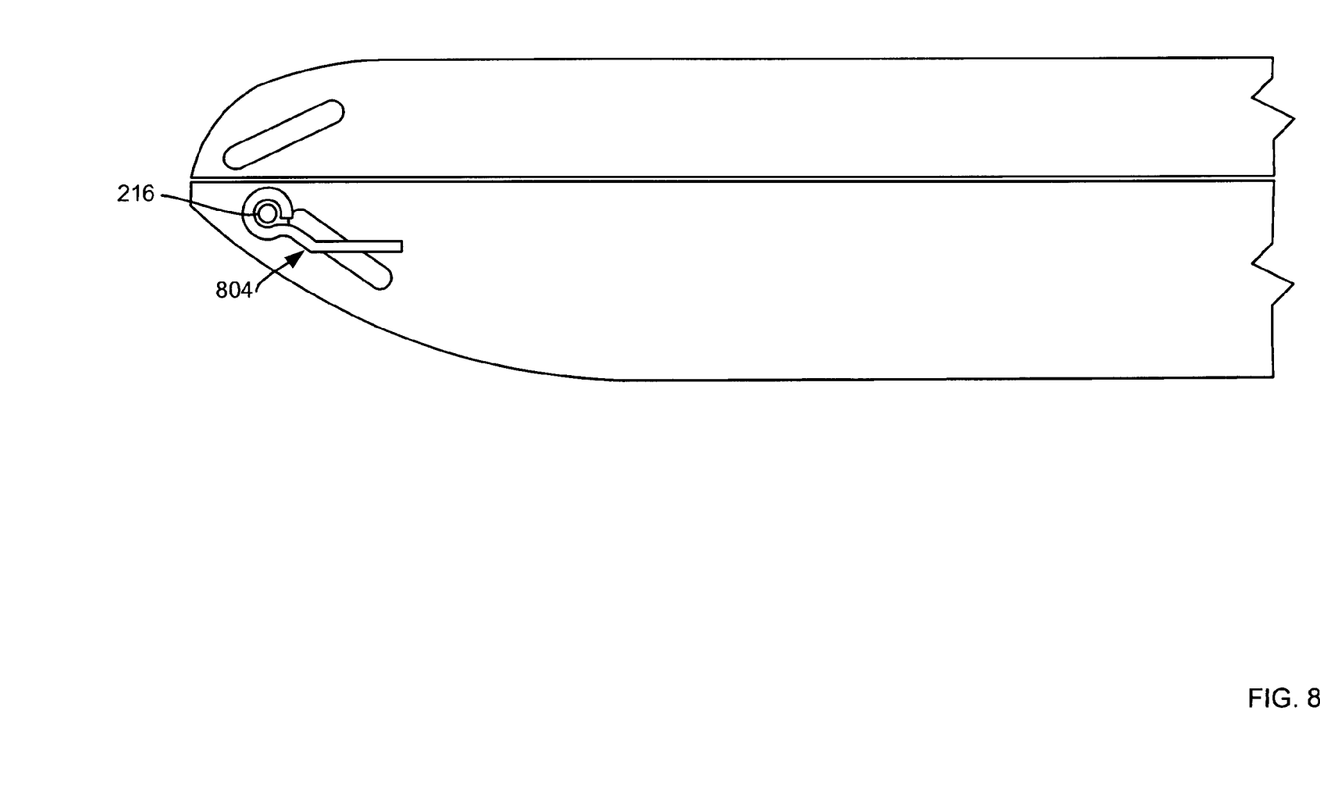
FIG. 8 is an illustrative representation of a friction clip in accordance with an embodiment of the present invention.

Turning to FIG. 8, FIG. 8 is an illustrative representation of a friction clip in accordance with an embodiment of the present invention. In particular, friction clip 804 may be configured to apply friction to base pin 216. Frictional elements may be selected in accordance with user preferences. In one embodiment, frictional element 804 may apply a linear friction component to base 216 through out the rotation range of movement. Linear friction may be desirable so that movement of a lid is uniform. Further, friction may be selected so as not to overcome the stationary weight of a base in embodiments of the present invention.

While this invention has been described in terms of several embodiments, there are alterations, permutations, and equivalents, which fall within the scope of this invention. It should also be noted that there are many alternative ways of implementing the methods and apparatuses of the present invention. For example, a ratcheting mechanism may be used instead of or in coordination with friction elements as illustrated. One skilled in the art can appreciate that a ratcheting mechanism may provide similar functionality as a friction element. Further more, embodiments of the present invention may find utility in other low profile applications requiring a hinge mechanism. The present invention may find further utility in applications requiring light weight construction materials. It is therefore intended that the following appended claims be interpreted as including all such alterations, permutations, and equivalents as fall within the true spirit and scope of the present invention.

What is claimed is:

1. A portable computing device comprising a base, a lid and a hinge mechanism, the base including at least a keyboard disposed at a top surface of the base, the hinge mechanism comprising:

a base link pivotally connected with the base such that the base link rotates about a first axis of rotation, the base link being in sliding communication with the lid;

a lid link pivotally connected with the lid such that the lid link rotates about a second axis of rotation, the lid link being in sliding communication with the base; and a center pin pivotally connecting the base link with the lid link such that the base link and the lid link rotate about a third axis of rotation wherein the base link, the lid link, and the center pin cooperatively function to translate the lid over at least two planes of motion with respect to the base, wherein a first rotation of the lid with respect to the base is associated with a maximum horizontal translation of the lid with respect to the base, the maximum horizontal translation of the lid with respect to the base being larger than any other horizontal translation of the lid with respect to the base with the base being coupled with the lid by the hinge mechanism, the first rotation being measured from a closed position of the lid with respect to the base, the keyboard being hidden when the lid is in the closed position with respect to the base, the keyboard being revealed when the lid is not in the closed position with respect to the base, a second rotation of the lid with respect to the base is associated with a maximum vertical translation of the lid above the top surface of the base, the maximum vertical translation of the lid with respect to the base being larger than any other vertical translation of the lid with respect to the base with the base being coupled with the lid by the hinge mechanism, the second rotation being measured from the closed position of the lid with respect to the base, and the first rotation of the lid with respect to the base is larger than the second rotation of the lid with respect to the base.

2. The portable computing device of claim 1 further comprising:
a base slider pin rigidly attached with the base link, the lid configured to slidingly receive the base slider pin; and
a lid slider pin rigidly attached with the lid link, the base configured to slidingly receive the lid slider pin.

3. The portable computing device of claim 1 wherein the base link is pivotally connected with the base by a base pin configured such that the base pin is rigidly connected with the base link and wherein the lid link is pivotally connected with the lid by a lid pin configured such that the lid pin is rigidly connected with the lid link.

4. The portable computing device of claim 3 further comprising a friction element that is provided with the base such that a frictional force may be applied to the base pin.

5. The portable computing device of claim 4 wherein the frictional force is configured to provide linear friction over a lid rotation of approximately 0 to 120 degrees.

6. The portable computing device of claim 1 wherein the lid includes a computing device display, the computing device display being hidden when the lid is in the closed position with respect to the base, the computing device display being revealed when the lid is not in the closed position with respect to the base.

7. A portable computing device, comprising:
a base, the base including at least a keyboard disposed at a top surface of the base;
a lid; and
a hinge mechanism coupled with the base and the lid and arranged to translate the lid vertically and horizontally with respect to the base while the lid pivotally rotates with respect to the base,
wherein the lid includes a slide way configured to limit translation of the lid,
a first rotation of the lid with respect to the base is associated with a positive y-translation of the lid with respect to the top surface of the base along a virtual v-axis that is perpendicular to the top surface of the base, the first rotation being measured from a closed position of the lid with respect to the base, the keyboard being hidden when the lid is in the closed position with respect to the base, the keyboard being revealed when the lid is not in the closed position with respect to the base,
a second rotation of the lid with respect to the base is associated with a negative y-translation of the lid with respect to the top surface of the base alone the virtual y-axis, the second rotation being measured from the closed position of the lid with respect to the base, and
the top surface of the base is associated with zero v-translation of the lid with respect to the top surface of the base, the lid being configured to have the zero y-translation when the lid is in the closed position with respect to the base.

8. The portable computing device of claim 7 wherein the hinge mechanism comprises:
a base slider pin rigidly attached with the base link, the lid configured to slidingly receive the base slider pin; and
a lid slider pin rigidly attached with the lid link, the base configured to slidingly receive the lid slider pin.

9. The portable computing device of claim 8 wherein the base link is pivotally connected with the base by a base pin configured such that the base pin is rigidly connected with the base link and wherein the lid link is pivotally connected with the lid by a lid pin configured such that the lid pin is rigidly connected with the lid link.

10. The portable computing device of claim 9 further comprising a friction element that is provided with the base such that a frictional force may be applied to the base pin.

11. The portable computing device of claim 10 wherein the frictional force is configured to provide linear friction over a lid rotation of approximately 0 to 120 degrees.

12. The portable computing device of claim 7 wherein the lid includes a computing device display, the computing device display being hidden when the lid is in the closed position with respect to the base, the computing device display being revealed when the lid is not in the closed position with respect to the base.

13. The portable computing device of claim 7 the base slider pin translates over any of the paths selected from the group consisting of: straight path, semi-arcuate path, and arcuate path.

14. The portable computing device of claim 7 the lid slider pin translates over any of the paths selected from the group consisting of: straight path, semi-arcuate path, and arcuate path.

15. A hinge mechanism coupling a first piece to a second piece, the first piece including at least a computer component disposed at a top surface of the first piece, the hinge mechanism comprising:
a first link pivotally connected with the first piece such that the first link rotates about a first axis of rotation, the first link being in sliding communication with the second piece;
a second link pivotally connected with the second piece such that the second link rotates about a second axis of rotation, the second link being in sliding communication with the first piece;
a center pin pivotally connecting the first link with the second link such that the first link and the second link rotate about a third axis of rotation wherein the first link, the second link, and the center pin cooperatively function to translate the second piece over at least two planes of motion with respect to the first piece;
a first piece slider pin rigidly attached with the first link, the second piece configured to slidingly receive the first piece slider pin; and
a second piece slider pin rigidly attached with the second link, the first piece configured to slidingly receive the second piece slider pin,
wherein a first rotation of the second piece with respect to the first piece is associated with a positive y-translation of the second piece with respect to the top surface of the first piece along a virtual y-axis that is perpendicular to the top surface of the first piece, the first rotation being measured from a closed position of the second piece with respect to the first piece, the computer component being hidden when the second piece is in the closed position with respect to the first piece, the computer component being revealed when the second piece is not in the closed position with respect to the first piece,
a second rotation of the second piece with respect to the first piece is associated with a negative y-translation of the second piece with respect to the top surface of the first piece alone the virtual y-axis, the second rotation being measured from the closed position of the second piece with respect to the first piece,
the top surface of the first piece is associated with zero y-translation of the second piece with respect to the top surface of the first piece, the second piece being configured to have the zero v-translation when the second piece is in the closed position with respect to the first piece, and the second rotation of the second piece with respect to the first piece is larger than the first rotation of the second piece with respect to the first piece.

16. The hinge mechanism of claim 15 wherein the first link is pivotally connected with the first piece by a first piece pin configured such that the first piece pin is rigidly connected with the first link and wherein the second link is pivotally connected with the second piece by a second piece pin configured such that the second piece pin is rigidly connected with the second link.

17. The hinge mechanism of claim 16 further comprising a friction element that is provided with the first piece such that a frictional force may be applied to the first piece pin.

18. The hinge mechanism of claim 17 wherein the frictional force is configured to provide linear friction over a second piece rotation of approximately 0 to 120 degrees.

19. The hinge mechanism of claim 15 wherein at least one of the first link and the second link remains a same shape whenever the second piece is translated relative to the first piece.

20. The hinge mechanism of claim 15 wherein the first link and the second link are directly connected only by the center pin.

* * * * *